(12) United States Patent
Arakawa et al.

(10) Patent No.: US 8,938,070 B2
(45) Date of Patent: Jan. 20, 2015

(54) ENCRYPTION USING REAL-WORLD OBJECTS

(75) Inventors: Yutaka Arakawa, Fukuoka (JP); Naoaki Yamanaka, Tokyo (JP); Eiji Oki, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 58 days.

(21) Appl. No.: 13/395,119

(22) PCT Filed: May 24, 2011

(86) PCT No.: PCT/US2011/037788
§ 371 (c)(1),
(2), (4) Date: Jul. 20, 2012

(87) PCT Pub. No.: WO2012/161697
PCT Pub. Date: Nov. 29, 2012

(65) Prior Publication Data
US 2012/0300923 A1  Nov. 29, 2012

(51) Int. Cl.
*H04L 9/00* (2006.01)
*H04W 12/02* (2009.01)
*H04L 9/08* (2006.01)

(52) U.S. Cl.
CPC ............. *H04W 12/02* (2013.01); *H04L 9/0866* (2013.01); *H04L 9/0872* (2013.01)
USPC ............................................. 380/44; 726/27

(58) Field of Classification Search
USPC .......................................................... 380/44
See application file for complete search history.

(56) References Cited

U.S. PATENT DOCUMENTS

| 4,809,067 A * | 2/1989 | Kikuchi et al. ........... 375/240.12 |
| 7,308,099 B1 * | 12/2007 | Allamanche et al. ......... 380/210 |
| 7,996,683 B2 * | 8/2011 | Lyseggen et al. ............. 713/186 |
| 2004/0044824 A1 * | 3/2004 | Haneda et al. .................... 711/1 |
| 2004/0086115 A1 * | 5/2004 | Laih et al. ........................ 380/30 |
| 2004/0141612 A1 * | 7/2004 | Tsutsui et al. .................. 380/28 |
| 2008/0184375 A1 * | 7/2008 | Nonaka et al. ................. 726/27 |

(Continued)

FOREIGN PATENT DOCUMENTS

| GB | 2447674 B * | 8/2011 |
| JP | 2001036638 A | 2/2001 |

(Continued)

OTHER PUBLICATIONS

International Search Report for PCT/US2011/037788, Jan. 9, 2012.

(Continued)

*Primary Examiner* — Mohammad W Reza
*Assistant Examiner* — Monjour Rahim
(74) *Attorney, Agent, or Firm* — Amin, Turocy & Watson, LLP

(57) ABSTRACT

Technologies are generally described for providing an encryption method using real-world objects. In some examples, a method may include capturing, by a first electronic device, an external object, generating an object signal associated with the external object, generating an encryption key based on the object signal, and transmitting data encrypted by the encryption key to a second electronic device.

37 Claims, 9 Drawing Sheets

(56) References Cited

U.S. PATENT DOCUMENTS

| | | |
|---|---|---|
| 2009/0046860 A1* | 2/2009 | Bichler et al. ............... 380/270 |
| 2009/0117883 A1 | 5/2009 | Coffing et al. |
| 2009/0240947 A1* | 9/2009 | Goyal et al. ................. 713/176 |
| 2010/0017618 A1* | 1/2010 | Golic et al. .................. 713/186 |
| 2011/0135144 A1* | 6/2011 | Franklin et al. .............. 382/100 |
| 2013/0114811 A1* | 5/2013 | Boufounos et al. .......... 380/255 |

FOREIGN PATENT DOCUMENTS

| | | |
|---|---|---|
| JP | 2008199263 A | 8/2008 |
| JP | 2009194602 | 8/2009 |
| WO | WO2010087797 | 8/2010 |

OTHER PUBLICATIONS

Using a Combination of Sound and Images to Authenticate Web Users, pp. 1-4.

Francesco Bergadano, et al., User Authentication Through Keystroke Dynamics, ACM Transactions on Information and System Security, vol. 5, No. 4 Nov. 2002, pp. 1-31, University of Torino.

Herbert Bay, et al., SURF: Speeded Up Robust Features, Katholieke Universiteit Leuven, pp. 1-14.

For Images and Voice Authentication; Yahoo! Japan ID, pp. 1-5, http://help.yahoo.co.jp/help/jp/edit/edit-57.html.

Jim Liddell, Using a Combination of Sound and Images to Authenticate Web Users, University of Glasgow, NCR FSD—Advanced Technology and Research, Dundee, pp. 1-4.

\* cited by examiner

ENCRYPTION USING REAL-WORLD OBJECTS

RELATED APPLICATION

The subject application is a US national stage application of PCT Application Serial No. PCT/US11/037,788, filed May 24, 2011, and entitled "ENCRYPTION USING REAL-WORLD OBJECTS," the disclosure of which is incorporated herein by reference in its entirety.

BACKGROUND

User authentication provides an individual with secure access to confidential or personal information or services. In particular, in an environment where two devices are connected to each other via an ad-hoc or other communication network, authentication of the communication counterpart prevents eavesdropping by a third party.

SUMMARY

In an example, a method may include capturing, by a first electronic device, an external object, generating an object signal associated with the external object, generating an encryption key based on the object signal, and transmitting data encrypted by the encryption key to a second electronic device.

In an example, a method may include detecting, by a first electronic device, an external object, detecting, by a second electronic device, the external object, generating, by the first electronic device, a first encryption key based on the external object, and generating, by the second electronic device, a second encryption key based on the external object.

In an example, a computer-readable storage medium whose contents, in response to execution by a first electronic device, may cause the processor to perform operations including capturing an external object, generating an object signal associated with the external object, generating an encryption key based on the object signal, and transmitting data encrypted by the encryption key to a second electronic device.

In an example, a data encryption device may include a capture unit configured to capture an external object, a key generation unit configured to generate an encryption key based on the external object, and a transmitter configured to transmit data encrypted by the encryption key to a data decryption device. The external object may be made known, identified or indicated to the data encryption device and the data decryption device.

In an example, a data decryption device may include a capture unit configured to capture an external object, a key generation unit configured to generate an encryption key based on the external object, and a receiver configured to receive data encrypted by the encryption key from a data encryption device. Information identifying the external object is made accessible to the data encryption device and the data decryption device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
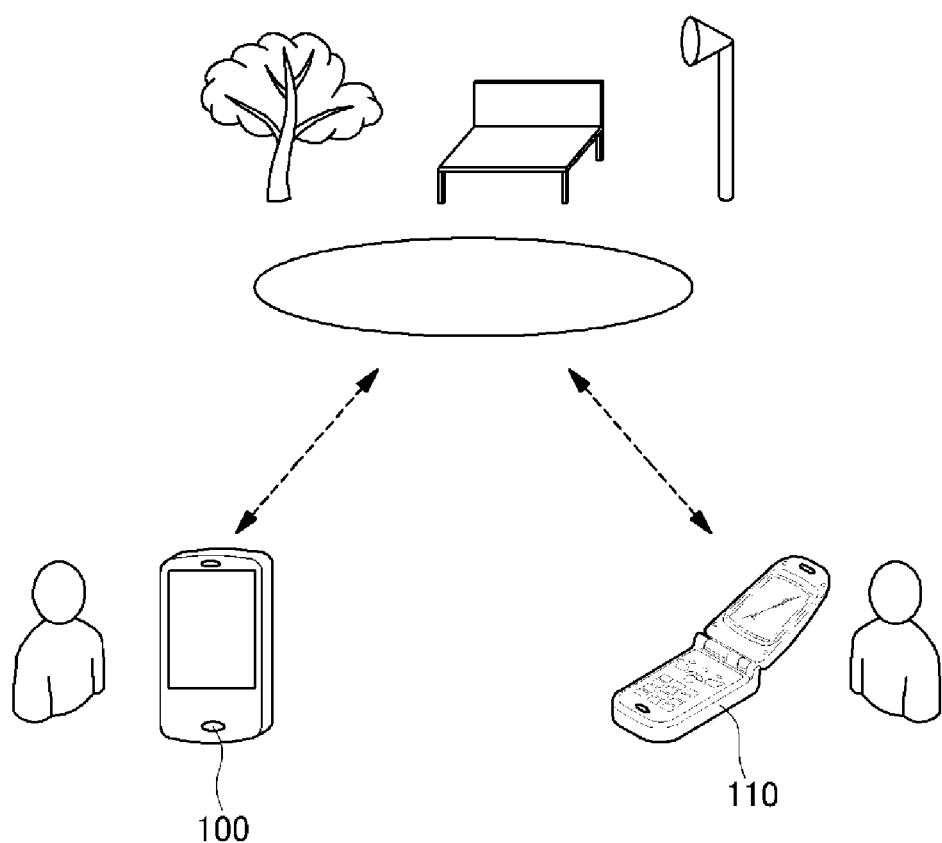
FIG. 1 schematically shows an illustrative example of an environment where multiple electronic devices may generate an encryption key based on a real-world object.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to an encryption technique using real-world objects.

Briefly stated, technologies are generally described for generating an encryption key based on an external object, such as an external sound or an external image. In some examples, the external object may be made known, identified or indicated to a first electronic device and a second electronic device, and the first and second electronic devices may respectively generate a first encryption key and a second encryption key based on the external object. The first and second electronic devices may store the generated first and second encryption keys, respectively, and use them for encrypting or decrypting the data to be transmitted therebetween.

The external object may refer to an object or phenomenon existing in the real world, such as an object in the background or ambient sound heard in the vicinity. These types of information (i.e., the object in the background or ambient sound heard in the vicinity) can be shared or known only to the parties (e.g., two or more parties) present at the location.

Also, by caching the shared encryption key in the sender's and recipient's terminals, it is possible to re-use the encryption key in subsequent remote communication. For example, the encryption key can be re-used later for encryption of files attached to e-mails or to encrypt a communication channel. For another example, by encrypting material distributed at a certain meeting with an encryption key generated at the time of the meeting, only those who actually participated in the meeting (i.e., those who share the key) can read the distributed material and materials that are subsequently exchanged via e-mails. In contrast, a third party who receives such materials, via mail forwarding, etc., is not able to read such materials. Furthermore, an expiration date may be set for the key so that the key can be used only up to the expiration date. The parties are then able to achieve secure communication by generating an encryption key using the external object information that is shared or known only to the parties present at the location, and superposing the encryption key on data to be sent between the parties. In one non-limiting embodiment, the encryption keys generated for a given exchange can also be saved remotely in a network store, or by a web service, and the encryption keys can be retrieved and re-used by a same party, but from a different device. For instance, an encryption key may be established based on an image of a bench in a park for an exchange of a file in the park between two parties with their cell phones, but later one of the parties wishes to review the content of the file from that party's personal computer. By retrieving the encryption key from the network store, or web service, greater versatility and use of the various embodiments can be made with respect to a wide variety of devices. Thus, the encryption key can be re-used by the first electronic device (or second electronic device) to encrypt subsequent communications with the second electronic device via an alternate communication channel. For instance, while the exchange in the park may have been via a short range wireless protocol such as Bluetooth, later communications between the first and second electronic devices can be secured with the encryption key via an alternate channel, such as a data network, wireless fidelity network, telecommunications network, etc.

FIG. 1 schematically shows an illustrative example of an environment where multiple electronic devices may generate an encryption key based on a real-world object arranged in accordance with at least some embodiments described herein. Electronic devices 100 and 110 may be located in a same environment so that electronic devices 100 and 110 can obtain same information from an external object. By way of example, but not limitation, two users (e.g., people) may be at a same location, such as a park, where a pond, a tree, a bench, and a loudspeaker, etc. exist. Each user can then use his or her respective electronic device 100 or 110 to capture an ambient sound thereabouts or nearby, such as, for example, music being broadcast from the loudspeaker in the park, animal noise, etc., and generate an encryption key, respectively, based on the captured sound. In some embodiments, one of the users can cause his or her electronic device 100 or 110 to output a sound. Both users can then capture the output sound using his or her respective electronic device 100 and 110, and generate an encryption key based on the sound output from the one of electronic devices 100 and 110 (that is, the sound captured by electronic devices 100 and 110). In some embodiments, each user can use his or her respective electronic device 100 or 110 to capture an image of an external object thereabouts or nearby, such as, for example, an image of scenery in the park around both users, or a separate image of one of the pond, tree, bench or loudspeaker located in the park, and generate an encryption key, respectively, based on the captured image. By way of example, but not limitation, electronic devices 100 and 110 may include a portable electronic device, such as, for example, a mobile phone, a smart phone, a personal digital assistant (PDA), a tablet computer, a netbook computer, or a laptop computer.

Although FIG. 1 illustrates that two electronic devices, e.g., electronic devices 100 and 110, located in a same environment generate an encryption key based on an external object in the same environment, one skilled in the art will appreciate that any number of electronic devices located in the same environment can participate in the encryption scheme arranged in accordance with at least some embodiments described herein. Moreover, the environment is not limited to a park as illustrated in FIG. 1, and any location having a real-world object will suffice for encryption of the various embodiments described herein.

Figure 2:
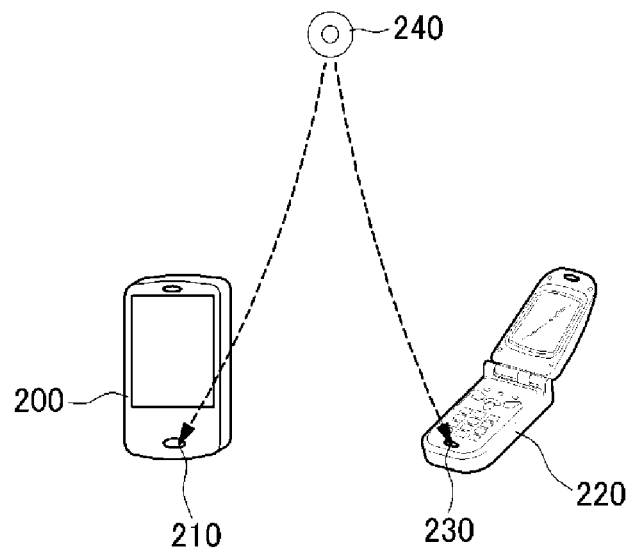
FIG. 2 schematically shows an illustrative example of an environment where multiple electronic devices may generate an encryption key based on an external sound output from an external sound source around the multiple electronic devices.

FIG. 2 schematically shows an illustrative example of an environment where multiple electronic devices may generate an encryption key based on an external sound output from an external sound source around or near the multiple electronic devices arranged in accordance with at least some embodiments described herein. As depicted in FIG. 2, an electronic device 200 including a microphone 210 and an electronic device 220 including a microphone 230 may be located in the vicinity of an external sound source 240. Respective microphones 210 and 230 of electronic devices 200 and 220 may then be used to capture or record a sound output by external sound source 240. Electronic devices 200 and 220 may then generate encryption keys, respectively, based on the captured sound.

By way of example, but not limitation, external sound source 240 may be a loudspeaker, a horn, a public address system, a radio, a television set, a tape player, a stereo system, a musical instrument, a siren, a vehicle engine, a vehicle tire, or an animal, etc. By way of example, but not limitation, microphones 210 and 230 may include an internal microphone or an external microphone operatively connected to each of electronic devices 200 and 220.

Figure 3:
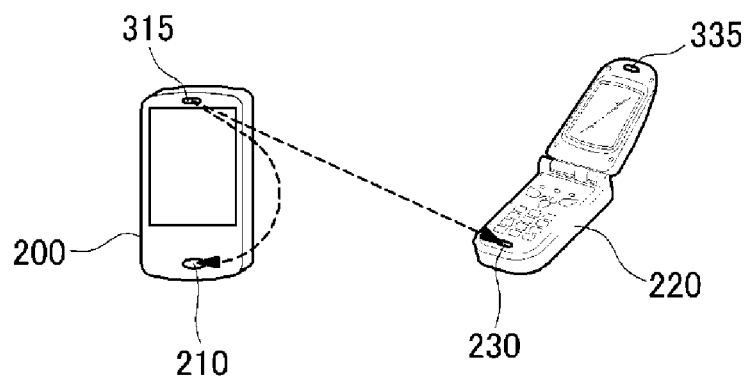
FIG. 3 schematically shows an illustrative example of an environment where multiple electronic devices may generate an encryption key based on a sound output from one of the multiple electronic devices.

FIG. 3 schematically shows an illustrative example of an environment where multiple electronic devices may generate an encryption key based on a sound output from one of the multiple electronic devices arranged in accordance with at least some embodiments described herein. As depicted in FIG. 3, electronic devices 200 and 220 are shown also including speakers 315 and 335, respectively, and may be in the same location or vicinity. In some embodiments, one of the electronic devices, e.g., electronic device 200, may then be used to output a sound through its speaker, e.g., speaker 315. Respective microphones 210 and microphone 230 of electronic devices 200 and 220 may be used to capture or record the sound output by one of the electronic devices, e.g., electronic device 200. Electronic devices 200 and 220 may then generate encryption keys, respectively, based on the captured sound. In some embodiments, the sound output by one of the electronic devices and used to generate the encryption key may be a weak sound, or a high-frequency sound, e.g., which attenuates considerably.

Figure 4:
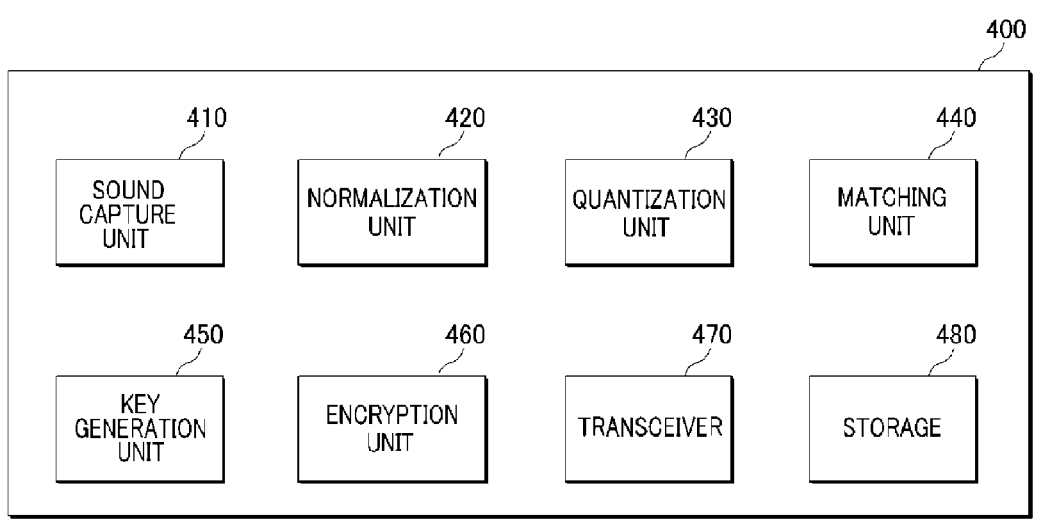
FIG. 4 shows a schematic block diagram of an illustrative example of an electronic device for generating an encryption key based on an external sound.

FIG. 4 shows a schematic block diagram of an illustrative example of an electronic device for generating an encryption key based on an external sound arranged in accordance with at least some embodiments described herein. As depicted, an electronic device 400 may include a capture unit such as a sound capture unit 410, a normalization unit 420, a quantization unit 430, a matching unit 440, a key generation unit 450, an encryption unit 460, a transceiver 470, and storage 480. Although illustrated as discrete components, various components may be divided into additional components, combined into fewer components, or eliminated, depending on the desired implementation.

Sound capture unit 410 may be configured to capture an external sound. By way of example, but not limitation, the external sound may include an ambient sound in the vicinity of electronic device 400, a sound output from a speaker (not shown) of electronic device 400, or a sound output from a counterpart or another electronic device (not shown) near or in the vicinity of electronic device 400. The counterpart electronic device may be used to decrypt encrypted data received from electronic device 400 using the encryption key generated using the captured external sound. By way of example, but not limitation, sound capture unit 410 may include a microphone, an acoustic-to-electric transducer, or a sound sensor.

Normalization unit 420 may be configured to normalize or perform normalization of the external sound captured by sound capture unit 410. Such normalization of the external sound may be helpful due to the difference between the sounds captured by electronic device 400 and the counterpart electronic device (not shown), which is caused by the difference in the sensitivity of sound capture unit 410 of electronic device 400 and the sound capture unit (not shown) of the counterpart electronic device (not shown), and/or the type of operating systems of electronic device 400 and the counterpart electronic device (not shown).

In some embodiments, normalization unit 420 may perform normalization of the external sound based on one or more normalization parameters shared between electronic device 400 and the counterpart electronic device (not shown). In some embodiments, normalization unit 420 may detect a maximum magnitude and a minimum magnitude of the external sound captured by sound capture unit 410, and designate the detected maximum magnitude and minimum magnitude of the external sound as the normalization parameters. Electronic device 400 may send/receive to/from the counterpart electronic device (not shown) the normalization parameters, as will be further described below.

Quantization unit 430 may be configured to quantize or perform quantization of the normalized external sound and generate at least one quantization pattern. In some embodiments, quantization unit 430 may perform quantization of the normalized external sound for at least a part of the available quantization bit depths up to a maximum available quantization bit depth. In some embodiments, quantization unit 430 may perform quantization of the normalized external sound for the available quantization bit depths up to the maximum available quantization bit depth. In some embodiments, the maximum available quantization bit depth may be determined in advance and shared between electronic device 400 and the counterpart electronic device (not shown). Table 1 below illustrates an example list of quantization patterns in cases where quantization unit 430 quantizes the normalized external sound for all of the available quantization bit depths (where the minimum available quantization bit depth is 2) up to the maximum available quantization bit depth of 16.

TABLE 1

| Quantization bit depth | Quantization pattern |
|---|---|
| 2 | 0101011110010 |
| 3 | 0001010101011 |
| 4 | 1100101010011 |
| ... | ... |
| 16 | 1101001010101 |

Matching unit 440 may be configured to identify, among the generated at least one quantization pattern, at least one matching quantization pattern, which matches at least one counterpart quantization pattern generated by the counterpart electronic device (not shown). By way of example, but not limitation, matching unit 440 may determine whether each of the at least one counterpart quantization pattern generated by the quantization unit of the counterpart electronic device (not shown) matches the at least one quantization pattern generated by quantization unit 430, thereby identifying at least one matching quantization pattern. If one of the at least one counterpart quantization pattern matches one of the at least one quantization pattern generated by quantization unit 430, electronic device 400 may store or record the one of the at least one quantization pattern as a matching quantization pattern, for example, in storage 480 (described below).

Key generation unit 450 may be configured to generate an encryption key by selecting one of the identified at least one matching quantization pattern as the encryption key. In some embodiments, key generation unit 450 may select the encryption key based on a quantization bit depth. By way of example, but not limitation, key generation unit 450 may select one matching quantization pattern whose quantization bit is largest among the at least one matching quantization pattern.

Encryption unit 460 may be configured to encrypt data to be sent or transmitted by electronic device 400, for example, to the counterpart electronic device (not shown), with the encryption key generated by key generation unit 450.

Transceiver 470 may be configured to transmit and receive data that is being sent and received, respectively, by electronic device 400. The data may include, without limitation, the encrypted data, normalization parameters, or quantization patterns. For example, transceiver 470 may transmit the encrypted data that is being sent or transmitted by electronic device 400, for example, to the counterpart electronic device (not shown), and receive data that is being received by electronic device 400, for example, from the counterpart electronic device (not shown). In another example, transceiver 470 may transmit the normalization parameters designated by normalization unit 420, for example, to the counterpart electronic device (not shown), or receive normalization parameters from another electronic device (e.g., normalization parameters designated by a normalization unit (not shown) of the counterpart electronic device (not shown)). In a further example, transceiver 470 may transmit the quantization pattern generated by quantization unit 430, for example, to the counterpart electronic device (not shown), or receive a quantization pattern from another electronic device (e.g., quantization pattern generated by the quantization unit (not shown) of the counterpart electronic device (not shown)).

Storage 480 may be configured to store the encryption key generated by key generation unit 450. Storage 480 may provide the stored encryption key to encryption unit 460, so that encryption unit 460 can encrypt data to be sent to the counterpart electronic device (not shown) with the encryption key stored in storage 480. In some embodiments, storage 480 may store the generated encryption key in association with an identifier of the counterpart electronic device (not shown). In some embodiments, storage 480 may store the generated encryption key in association with its expiration date information. Table 2 below illustrates an example list of the generated encryption keys stored in storage 480 together with the identifier of the corresponding counterpart device and the expiration date information associated with the generated encryption keys.

TABLE 2

| Encryption key | Identifier of counterpart | Expiration date |
|---|---|---|
| 01010101001 | FF:FF:FF:CC:CC:DD | 2011/05/01 10:23:45 |
| 11010110101 | AA:BB:CC:DD:FF | 2011/05/02 00:09:52 |
| 10010101001 | AA:AA:BB:DD:FF:FF | 2011/06/30 21:32:43 |
| 10100101010 | BB:CC:CC:DD:FF | 2011/07/11 09:18:38 |

Figure 5:
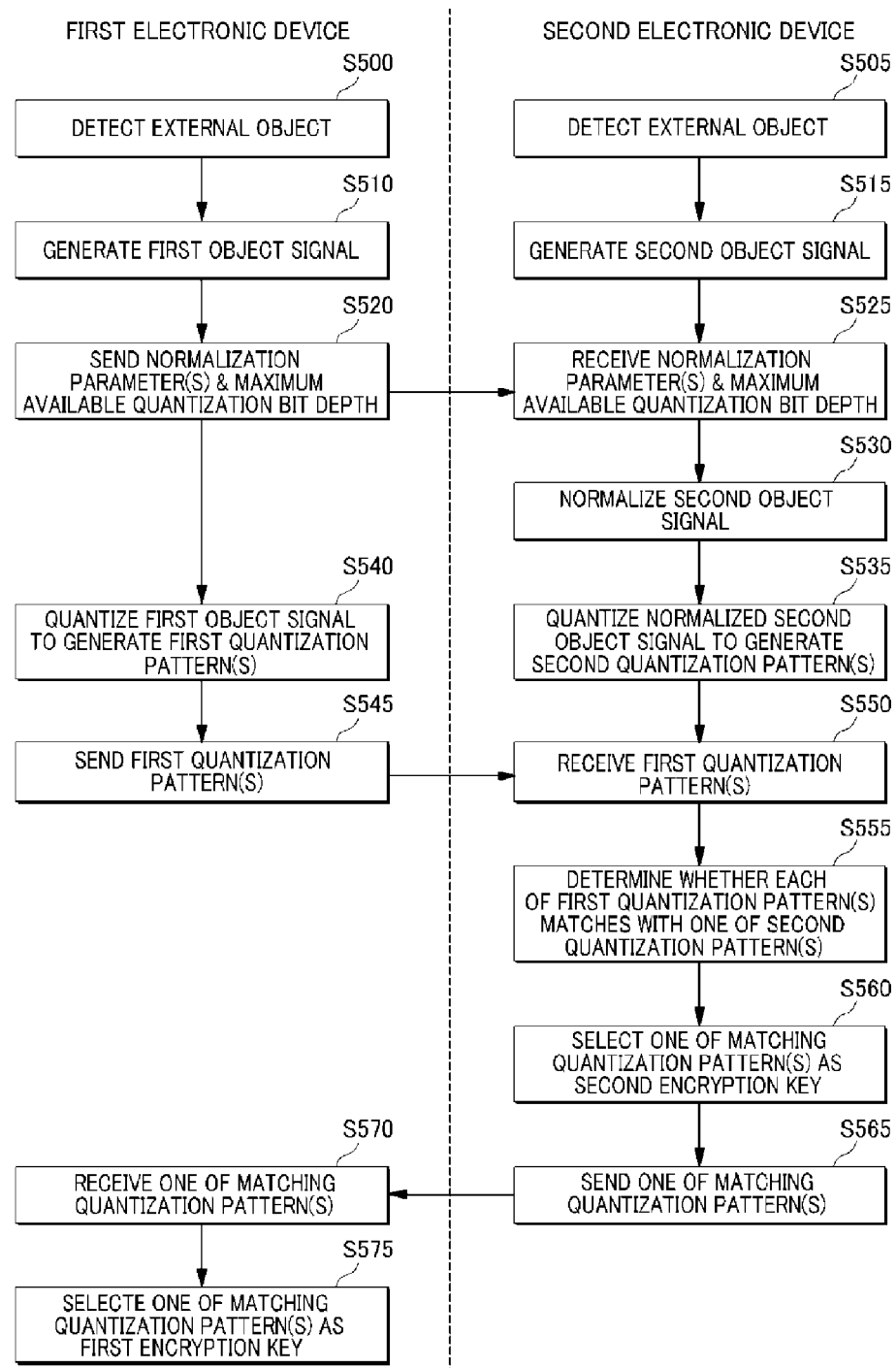
FIG. 5 shows an example flow diagram of a method for generating an encryption key based on an external sound.

FIG. 5 shows an example flow diagram of a method for generating an encryption key based on an external sound arranged in accordance with at least some embodiments described herein. The method in FIG. 5 could be implemented using, for example, two electronic devices, such as the electronic devices discussed above with reference to FIG. 4. In FIG. 5, the blocks in the left side may be implemented by a first electronic device, while the blocks in the right side may be implemented by a second electronic device. An example method may include one or more operations, actions, or functions as illustrated by one or more of blocks S500, S505, S510, S515, S520, S525, S530, S535, S540, S545, S550, S555, S560, S565, S570 and/or S575. Although illustrated as discrete blocks, various blocks may be divided into additional blocks, combined into fewer blocks, or eliminated, depending on the desired implementation. Further, some blocks illustrated as being implemented by the first electronic device may be implemented by the second electronic device, and some blocks illustrated as being implemented by the second electronic device may be implemented by the first electronic device. Processing may begin at block S500 and/or block S505.

At block S500, the first electronic device may detect an external object, such as, for example, an external sound selected from a group consisting of an ambient sound in the vicinity of the first and second electronic devices and a sound output from one of the first and second electronic devices. At block S505, the second electronic device may also detect the external object, which is substantially the same external object detected by the first electronic device at block S500. The detecting at block S500 and the detecting at block S505 may be performed simultaneously or at slightly different times. Processing may continue from block S500 to block S510 in the first electronic device, and from block S505 to block S515 in the second electronic device.

At block S510, the first electronic device may generate a first object signal associated with the external object. Similarly, at block S515, the second electronic device may generate a second object signal associated with the external object. Processing may continue from block S510 to block S520 in the first electronic device, and from block S515 to block S525 in the second electronic device.

At block S520, the first electronic device may send, to the second electronic device, information to be commonly used by the first and second electronic devices for generating encryption keys. In some embodiments, the information to be commonly used may include at least one normalization parameter and a maximum available quantization bit depth. By way of example, but not limitation, the at least one normalization parameter may include a maximum magnitude and a minimum magnitude of the object signal. In such a case, the first electronic device may detect the maximum and minimum magnitudes of the first object signal, and designate the maximum and minimum magnitudes of the first object signal as the normalization parameters. Then, at block S525, the second electronic device may receive from the first electronic device the information to be commonly used by the first and second electronic devices for generating encryption keys, such as, for example, the at least one normalization parameter and the maximum available quantization bit depth. Then, at block S530, the second electronic device may perform normalization of the second object signal based on the received at least one normalization parameter. Although FIG. 5 illustrates that the first electronic device designates the at least one normalization parameter and the second electronic device normalizes the second object signal based on the at least one normalization parameter designated by the first electronic device, it is noted that it is also possible that the second electronic device designates the at least one normalization parameter and the first electronic device normalizes the first object signal based on the at least one normalization parameter designated by the second electronic device, or both of the first electronic device and the second electronic device respectively normalize the first object signal and the second object signal based on at least one normalization parameter previously shared between the first and second electronic devices. Processing may continue from block S520 to block S540 in the first electronic device, and from block S530 to block S535 in the second electronic device.

At block S535, the second electronic device may quantize or perform quantization of the normalized second object signal, thereby generating at least one second quantization pattern. In some embodiments, the second electronic device may quantize the normalized second object signal for all of available quantization bit depths up to the maximum available quantization bit depth, to generate at least one second quantization pattern corresponding to the respective available quantization bit depths. In such a case, the second electronic device may store or record the generated at least one second quantization pattern in a storage. Similarly, at block S540, the first electronic device may perform quantization of the first object signal, thereby generating at least one first quantization pattern. In some embodiments, the first electronic device may quantize the first object signal for at least a part of the available quantization bit depths up to the maximum available quantization bit depth gradually one by one. In some embodiments, the initially generated one of the at least one first quantization pattern may be quantized for a quantization bit depth corresponding to the intermediate value of the maximum available quantization bit depth and the minimum available quantization bit depth. In some embodiments, the initially generated one of the at least one first quantization pattern may have a quantization bit depth corresponding to the maximum or minimum available quantization bit depth. For example, the minimum available quantization bit depth may be two. Processing may continue from block S540 to block S545 in the first electronic device, and from block S535 to block S550 in the second electronic device.

At block S545, the first electronic device may send to the second electronic device the generated at least one first quantization pattern. In some embodiments, the first electronic device may send to the second electronic device all of the generated at least one first quantization pattern at once. In some embodiments, the first electronic device may send to the second electronic device the at least one first quantization pattern gradually one by one. Then, at block S550, the second electronic device may receive from the first electronic device the at least one first quantization pattern. Processing may continue from block S550 to block S555 in the second electronic device.

At block S555, the second electronic device may determine whether each of the received at least one first quantization pattern matches one of the at least one second quantization pattern, thereby identifying at least one matching quantization pattern. If one of the received at least one first quantization pattern matches one of the at least one second quantization pattern, the second electronic device may store or record the quantization pattern as a matching quantization pattern. Processing may continue from block S555 to block S560 in the second electronic device.

At block S560, the second electronic device may select one of the at least one matching quantization pattern as the second encryption key. In some embodiments, the second electronic device may select the second encryption key based on a quantization bit depth. In some embodiments, the second electronic device may select one matching quantization pattern whose quantization bit is largest among the at least one matching quantization pattern.

In some embodiments, the quantization of the first object signal (block S540) through the selection of the one of the at least one matching quantization pattern (block S560) may be performed via an iterative process. In an example where the maximum available quantization bit depth and the minimum available quantization bit depth are 16 and 2, respectively, the second electronic device may generate in advance the second quantization patterns for bit depths of 2 bits (i.e., the minimum available quantization bit depth) to 16 bits (i.e., the maximum available quantization bit depth). The first electronic device may quantize the first object signal for an initial quantization bit depth, thereby generating an initial first quantization pattern. Then, the first electronic device may send the initial first quantization pattern to the second electronic device. The second electronic device may then check for a match between the received initial first quantization pattern and the corresponding second quantization pattern, which is quantized by the second electronic device for the same quantization bit depth as the initial quantization bit depth. If the received initial first quantization pattern matches the corresponding second quantization pattern, the second electronic device may send to the first electronic device a request for increase in the quantization bit depth. On the other hand, if the received initial first quantization pattern does not match the corresponding second quantization pattern, the second electronic device may send to the first electronic device a request for decrease in the quantization bit depth. Then, the first electronic device may send to the second electronic device another first quantization pattern quantized at the increased or decreased quantization bit depth. Such a process may be repeated iteratively until finding out the one matching quantization pattern whose quantization bit is largest among the at least one matching quantization pattern.

In some embodiments, the maximum available quantization bit depth or the minimum available quantization bit depth may be used as the initial quantization bit depth. In some embodiments, alternatively, the intermediate value of the maximum available quantization bit depth and the minimum available quantization bit depth may be used as the initial quantization bit depth. Further, in some embodiments, the request for increase or decrease in the quantization bit depth may be a request for one-bit increase or one-bit decrease, or a request for multi-bit increase or multi-bit decrease. Processing may continue from block S560 to block S565 in the second electronic device.

Referring to FIG. 5 again, at block S565, the second electronic device may send to the first electronic device the selected one of the at least one matching quantization pattern. Then, at block S570, the first electronic device may receive the one of the at least one matching quantization pattern. At block S575, the first electronic device may select the received one of the at least one matching quantization pattern as the first encryption key.

It is noted that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Further, although the embodiments disclosed herein illustrate that two electronic devices share an environment to generate encryption keys for having a secure communication with each other, it is noted that any number of electronic devices located in a same environment can participate in the encryption scheme in accordance with at least some embodiments described herein.

Figure 6:
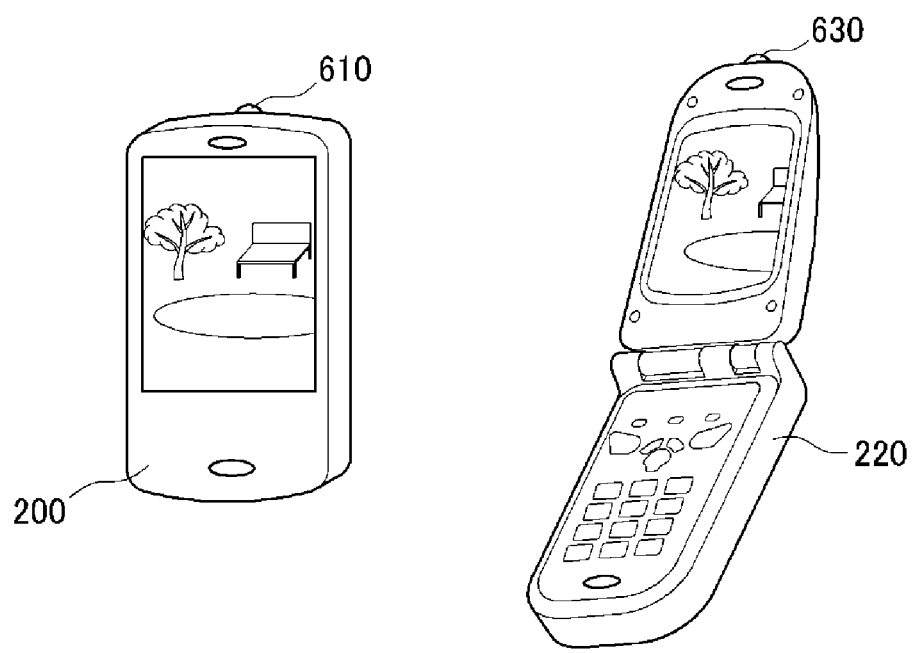
FIG. 6 schematically shows an illustrative example of an environment where multiple electronic devices may generate an encryption key based on an external image.

FIG. 6 schematically shows an illustrative example of an environment where multiple electronic devices may generate an encryption key based on an external image arranged in accordance with at least some embodiments described herein. In FIG. 6, electronic device 200 including a camera 610 and electronic device 220 including a camera 630 are located near or next to each other in the same environment. In some embodiments, electronic device 200 may capture, using camera 610, an external image near or thereabout, and generate an encryption key based on the captured image. Similarly, electronic device 220 may capture, using camera 630, an external image near or thereabout, which is identical or similar to the external image captured by electronic device 200, and generate an encryption key based on the captured image. The encryption key can then be used to encrypt or decrypt data to provide secure communication.

Figure 7:
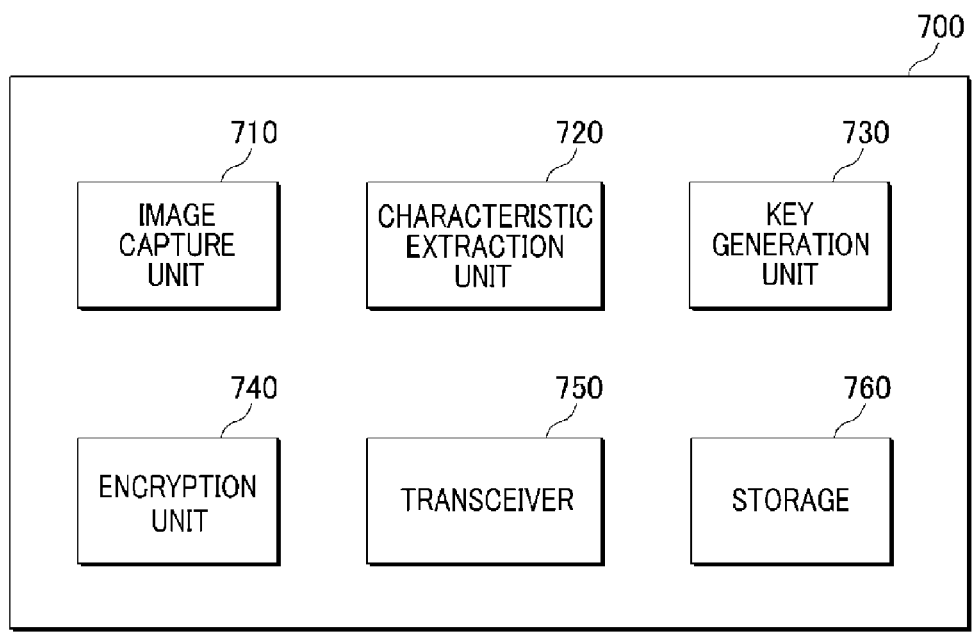
FIG. 7 shows a schematic block diagram of an illustrative example of an electronic device for generating an encryption key based on an external image.

FIG. 7 shows a schematic block diagram of an illustrative example of an electronic device for generating an encryption key based on an external image arranged in accordance with at least some embodiments described herein. As depicted, an electronic device 700 may include a capture unit such as an image capture unit 710, a characteristic extraction unit 720, a key generation unit 730, an encryption unit 740, a transceiver 750 and storage 760. Although illustrated as discrete components, various components may be divided into additional components, combined into fewer components, or eliminated, depending on the desired implementation.

Image capture unit 710 may be configured to capture an external image. By way of example, but not limitation, the external image is an image surrounding electronic device 700.

Although not illustrated in FIG. 7, electronic device 700 may further include an object extraction unit configured to extract a specific object image from the external image captured by image capture unit 710. By way of example, but not limitation, in cases where the external image captured by image capture unit 710 is an image of a park, where a pond, a tree, a bench, and a loudspeaker, etc. exist, the object extraction unit may extract an object image of a pond or a bench. In some embodiments, the object extraction unit may extract the object image based on an input of user of electronic device 700. By way of example, but not limitation, when electronic device 700 receives a user input through a user interface (not shown) that the user chooses to use an object image of a bench for generating an encryption key, the object extraction unit may extract an object image of the bench.

Characteristic extraction unit 720 may be configured to extract a characteristic vector value corresponding to the external image captured by image capture unit 710 or the object image extracted from the external image by the object extraction unit (not shown). Characteristic extraction unit 720 may employ any existing algorithm for extracting image characteristics, such as, for example, speeded up robust features (SURF) algorithm.

Key generation unit 730 may be configured to generate an encryption key based on the characteristic vector value extracted by characteristic extraction unit 720.

In some embodiments, key generation unit 730 may generate the encryption key by searching a codebook. By way of example, but not limitation, the codebook may be included in key generation unit 730 or another component, such as storage 760 (described below).

By way of example, but not limitation, the codebook may store multiple vector-key pairs each including a sample characteristic vector value and a key associated with the sample characteristic vector value. By way of example, but not limitation, each of the sample characteristic vector values in the codebook may be associated with sample images, including, for example, an image of a pond or a bench, or a combination thereof. By way of example, but not limitation, the codebook may be in a format shown in Table 3 below.

TABLE 3

| Sample characteristic vector value | Key |
|---|---|
| $\{1, 2, 3, 7, 1, 5, \ldots, x\}$ | aiaojrnmfil |
| $\{4, 6, x, 8, 1, 3, \ldots, s\}$ | adfjo0234fa@k |
| $\{3, 8, 0, 7, 1, y, \ldots, z\}$ | padivgahdjf |
| $\{9, 2, w, t, 3, 4, \ldots, 0\}$ | kgfvjl@voihg |

In some embodiments, key generation unit 730 may generate the encryption key based on the similarities between the extracted characteristic vector value and multiple sample characteristic vector values of sample images included in the codebook, e.g., similarities between the extracted characteristic vector value and each of the multiple sample characteristic vector values. In some embodiments, the similarities between the extracted characteristic vector value and the sample characteristic vector values may be calculated based on angular differences therebetween.

In some embodiments, key generation unit 730 may generate the encryption key based on a key generation function. The key generation function may include any existing hash function, such as, for example, MD5 hash function, or SHA1 hash function.

Encryption unit 740 may be configured to encrypt data to be sent or transmitted by electronic device 700, for example, to the counterpart electronic device (not shown) with the encryption key generated by key generation unit 730.

Transceiver 750 may be configured to transmit data to the counterpart electronic device (not shown), and receive data from the counterpart electronic device (not shown). In some embodiments, transceiver 750 may be connected to encryption unit 740, and transmit to the data encrypted by encryption unit 740 that is being sent or transmitted by electronic device 700, for example, to the counterpart electronic device (not shown), and receive data that is being received by electronic device 700, for example, from the counterpart electronic device (not shown).

Storage 760 may be configured to store the encryption key generated by key generation unit 730. Storage 760 may provide the stored encryption key to encryption unit 740, so that encryption unit 740 can encrypt data to be sent to the counterpart electronic device (not shown) with the encryption key stored in storage 760. In some embodiments, storage 760 may store the encryption key with further information, such as weather or time, when image capture unit 710 captures an external image.

Figure 8:
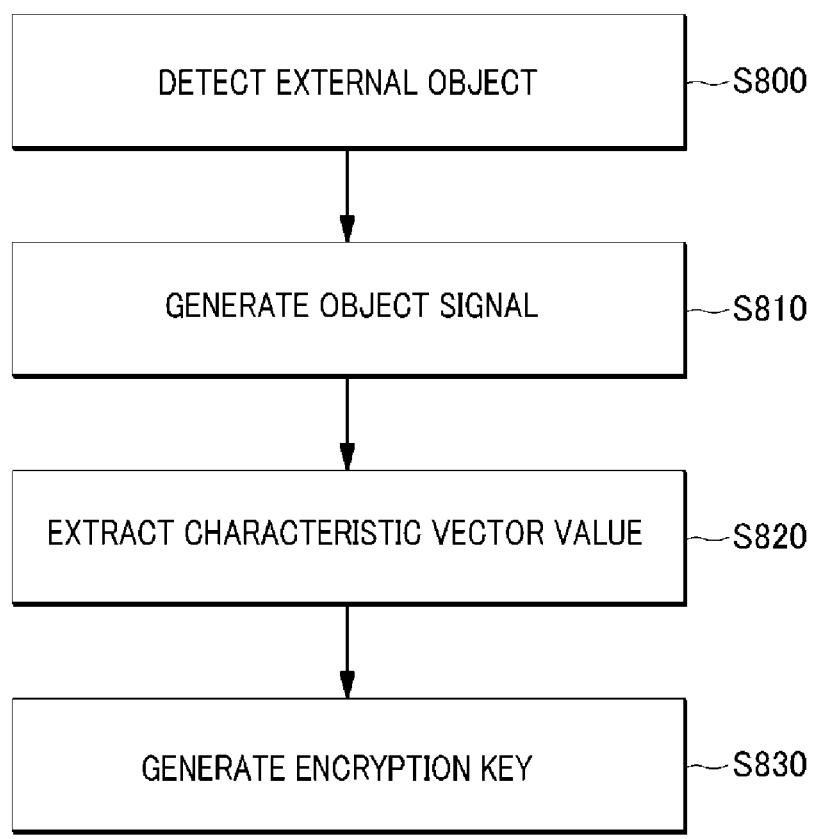
FIG. 8 shows an example flow diagram of a method for generating an encryption key based on an external image.

FIG. 8 shows an example flow diagram of a method for generating an encryption key based on an external image arranged in accordance with at least some embodiments described herein. The method in FIG. 8 could be implemented using, for example, an electronic device and a counterpart electronic device, each of which is discussed above with reference to FIG. 7. An example method may include one or more operations, actions, or functions as illustrated by one or more of blocks S800, S810, S820, and/or S830. Although illustrated as discrete blocks, various blocks may be divided into additional blocks, combined into fewer blocks, or eliminated, depending on the desired implementation. Processing may begin at block S800.

At block S800, the electronic device may detect an external object, such as, for example, an external image. By way of example, but not limitation, the external image is an image surrounding the electronic device or a specific object image extracted from the image surrounding the electronic device. Then, at block S810, the electronic device may generate an object signal associated with the external object. Processing may continue from block S810 to block S820.

At block S820, the electronic device may extract a characteristic vector value corresponding to the object signal. The characteristic vector value may correspond to at least a part of the external object. By way of example, but not limitation, any existing algorithm for extracting image characteristics, such as speeded up robust features (SURF) algorithm, may be employed for extracting the characteristic vector value. Processing may continue from block S820 to block S830.

At block S830, the electronic device may generate an encryption key based on the extracted characteristic vector value. In some embodiments, the electronic device may generate the encryption key by searching a codebook. By way of example, but not limitation, the codebook may store multiple vector-key pairs each including a sample characteristic vector value and a key associated with the sample characteristic vector value. By way of example, but not limitation, each of the sample characteristic vector values in the codebook may be associated with a sample image, including, for example, an image of a pond or a bench, or a combination thereof. In some embodiments, the electronic device may generate the encryption key based on the similarity between the extracted characteristic vector value and each of multiple sample characteristic vector values of sample images included in the codebook. In some embodiments, the similarity between the extracted characteristic vector value and each of the sample characteristic vector values may be calculated based on angular difference therebetween. In some embodiments, the electronic device may generate the encryption key based on a key generation function, which is shared between the electronic device and the counterpart electronic device. The key generation function may include any existing hash function, such as, for example, MD5 hash function, or SHA1 hash function.

Figure 9:
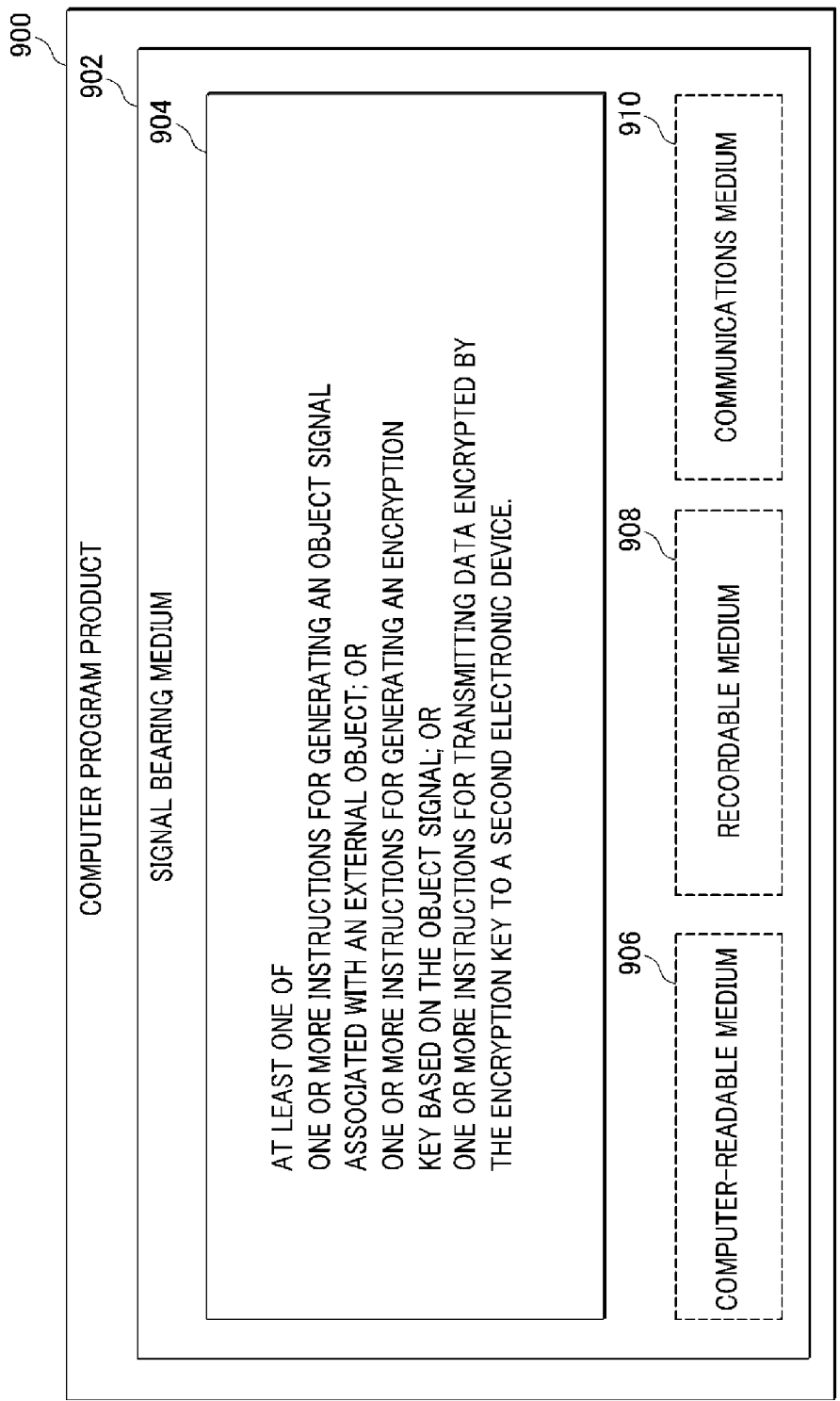
FIG. 9 illustrates computer program products that can be utilized to provide an encryption scheme using real-world objects.

FIG. 9 illustrates computer program products 900 that can be utilized to provide an encryption scheme using real-world objects in accordance with at least some embodiments described herein. Program product 900 may include a signal bearing medium 902. Signal bearing medium 902 may include one or more instructions 904 that, when executed by, for example, a processor, may provide the functionality described above with respect to FIGS. 1-8. By way of example, instructions 904 may include: one or more instructions for generating an object signal associated with an external object; one or more instructions for generating an encryption key based on the object signal; or one or more instructions for transmitting data encrypted by the encryption key to a second electronic device. Thus, for example, referring to the system of FIG. 2, electronic devices 200 and 220 may undertake one or more of the blocks shown in FIG. 5 in response to instructions 904.

In some implementations, signal bearing medium 902 may encompass a computer-readable medium 906, such as, but not limited to, a hard disk drive, a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of mobile device 110a by an RF signal bearing medium 902, where the signal bearing medium 902 is conveyed by a wireless communications medium 910 (e.g., a wireless communications medium conforming with the IEEE 802.11 standard).

Figure 10:
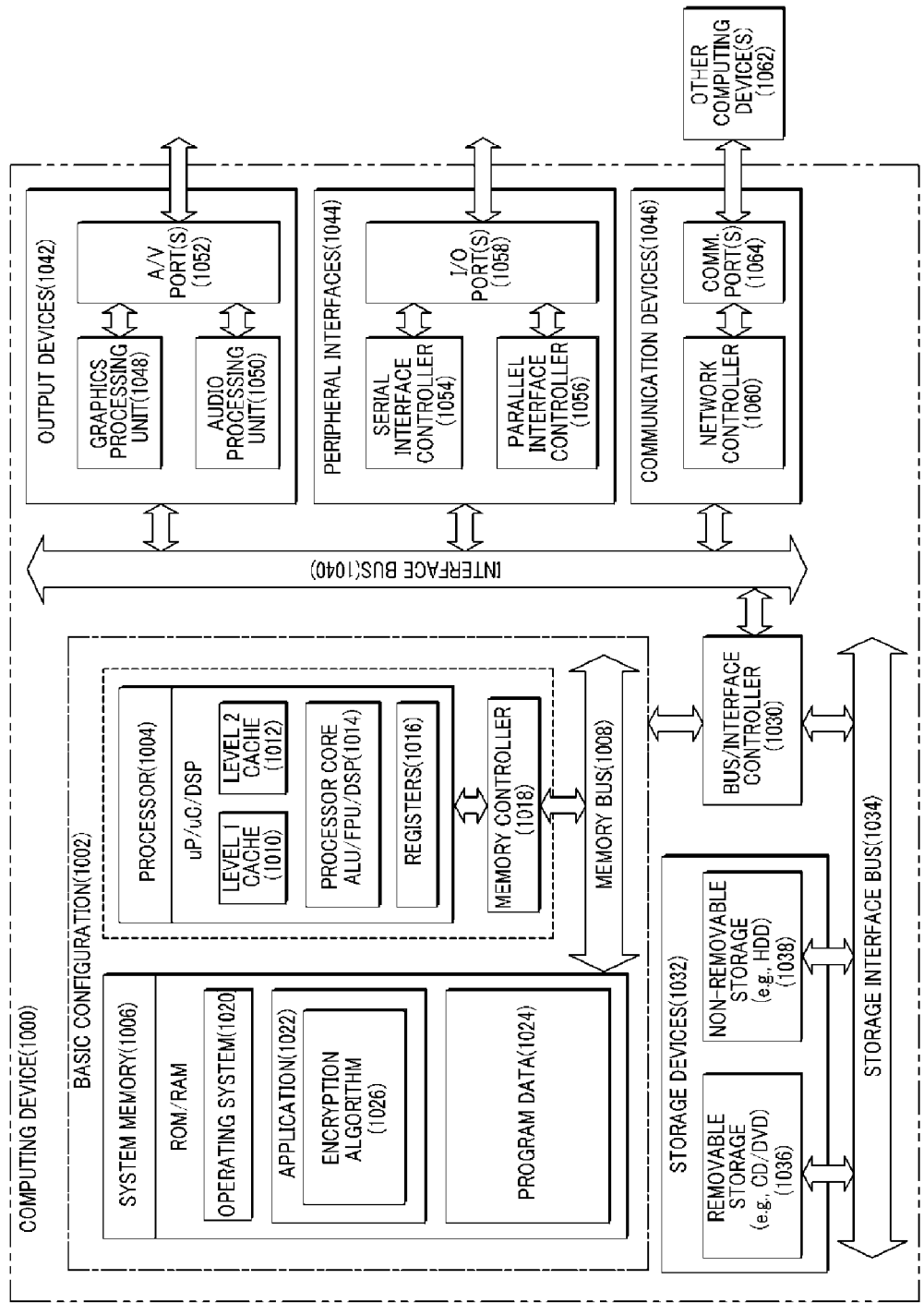
FIG. 10 is a block diagram illustrating an example computing device that can be utilized to provide an encryption scheme using real-world objects, all arranged in accordance with at least some embodiments described herein.
Figure 10:
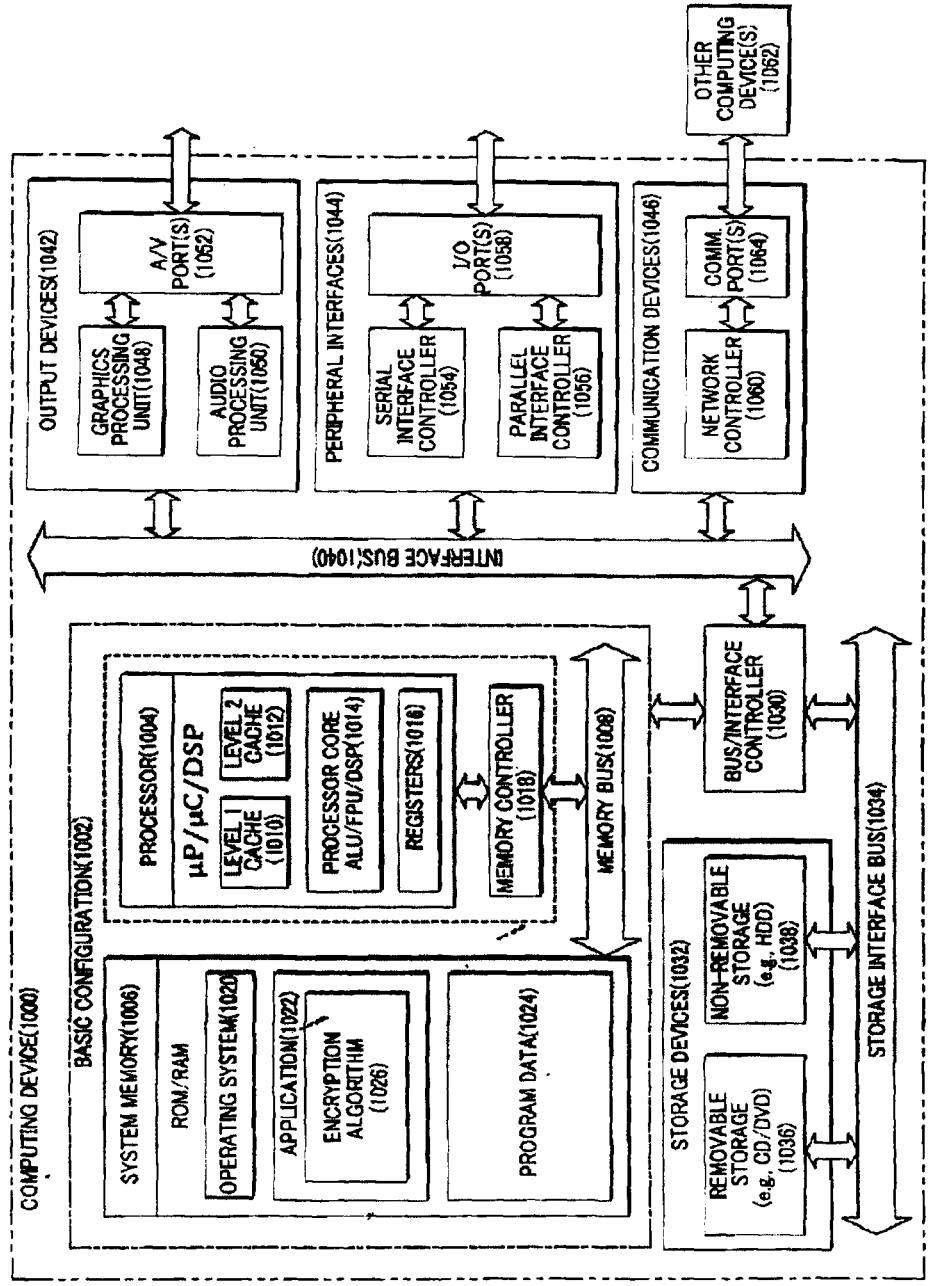

FIG. 10 is a block diagram illustrating an example computing device 1000 that can be utilized to provide an encryption scheme using real-world objects in accordance with at least some embodiments described herein. In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024.

Application 1022 may include an encryption algorithm 1026 that is arranged to perform the functions as described herein including those described previously with respect to FIGS. 1-7. Program data 1024 may include any data that may be useful for providing the encryption scheme using real-world objects as is described herein. In some embodiments, application 1022 may be arranged to operate with program data 1024 on operating system 1020 such that the encryption scheme using real-world objects may be provided. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
capturing, by a first electronic device, an external object associated with a sound;
generating an object signal associated with the external object;
normalizing the object signal to generate a normalized object signal based on at least one normalization parameter;
transmitting the at least one normalization parameter to a second electronic device;
extracting a characteristic vector value corresponding to the object signal;
generating an encryption key based on at least one quantization pattern associated with the normalized object signal including generating the encryption key based on similarities between the characteristic vector value and a plurality of sample characteristic vector values from a plurality of vector-key pairs each including a sample characteristic vector value and a key associated with the sample characteristic vector value; and transmitting data encrypted by the encryption key to the second electronic device.

2. The method of claim 1, wherein the generating the object signal includes generating the object signal based on an external noise signal.

3. The method of claim 1, wherein the capturing includes capturing, by the first electronic device, audio generated by the second electronic device.

4. The method of claim 1, further comprising:
transmitting the at least one quantization pattern to the second electronic device.

5. The method of claim 1, further comprising:
identifying at least one first quantization pattern of the at least one quantization pattern matching at least one second quantization pattern generated by the second electronic device,
wherein the generating of the encryption key comprises selecting one of the at least one first quantization pattern as the encryption key.

6. The method of claim 5, wherein the selecting includes selecting the encryption key based on a quantization bit depth.

7. The method of claim 1, wherein the capturing includes capturing, by the first electronic device, an external sound that is also captured by the second electronic device.

8. The method of claim 1, wherein the generating the object signal includes generating the object signal based on a portion of the sound.

9. The method of claim 1, wherein a plurality of sample characteristic vector values included in a codebook, the codebook storing a plurality of vector-key pairs each including a sample characteristic vector value and a key associated with the sample characteristic vector value.

10. The method of claim 9, further comprising:
determining the similarities based on angular differences between the characteristic vector value and the plurality of sample characteristic vector values.

11. The method of claim 1, wherein the generating the encryption key includes generating the encryption key based on a key generation function.

12. The method of claim 1, further comprising:
storing the encryption key.

13. The method of claim 12, wherein the storing comprises:
storing the encryption key in association with an identifier of the second electronic device.

14. The method of claim 12, wherein the storing comprises:
storing the encryption key in association with expiration date information.

15. A method, comprising:
detecting, by a first electronic device, an external object associated with audio;
detecting, by a second electronic device, the external object associated with the audio;
extracting a characteristic vector value corresponding to the object signal;
generating, by the first electronic device, a first encryption key based on at least one quantization pattern associated with the external object including generating the encryption key based on similarities between the characteristic vector value and a plurality of sample characteristic vector values from a plurality of vector-key pairs each including a sample characteristic vector value and a key associated with the sample characteristic vector value; and
generating, by the second electronic device, a second encryption key based on the external object, wherein the generating the encryption key includes generating the encryption key based on similarities between the characteristic vector value.

16. The method of claim 15, wherein the first encryption key is identical to the second encryption key.

17. The method of claim 15, wherein the detecting the external object by the first electronic device comprises detecting an external ambient sound or detecting a sound generated by the second electronic device.

18. The method of claim 15, further comprising:
generating, by the first electronic device, a first object signal associated with the external object; and
generating, by the second electronic device, a second object signal associated with the external object.

19. The method of claim 18, further comprising:
sending, by the first electronic device, to the second electronic device at least one normalization parameter and a maximum available quantization bit depth;
quantizing, by the second electronic device, the second object signal based on the at least one normalization parameter for available quantization bit depths up to the maximum available quantization bit depth, to generate at least one other quantization pattern corresponding to the available quantization bit depths;
quantizing, by the first electronic device, the first object signal for at least a part of the available quantization bit depths up to the maximum available quantization bit depth, to generate the at least one quantization pattern;
sending, by the first electronic device, to the second electronic device the at least one first quantization pattern;
determining, by the second electronic device, that the at least one quantization pattern matches one of the at least one other quantization pattern including identifying at least one matching quantization pattern;
selecting, by the first electronic device, one of the at least one matching quantization pattern as the first encryption key; and
selecting, by the second electronic device, one of the at least one matching quantization pattern as the second encryption key.

20. A computer-readable storage device comprising computer-executable instruction that, in response to execution, cause a first electronic device comprising at least one processor to perform operations comprising:
capturing an external sound;
generating an object signal associated with the external sound;
normalizing the object signal to generate a normalized object signal based on at least one normalization parameter;
transmitting the at least one normalization parameter to a second electronic device;
extracting a characteristic vector value corresponding to the object signal;
generating an encryption key based on at least one quantization bit pattern associated with the normalized object signal including generating the encryption key based on similarities between the characteristic vector value and a plurality of sample characteristic vector values from a plurality of vector-key pairs each including a sample characteristic vector value and a key associated with the sample characteristic vector value; and
transmitting data encrypted by the encryption key to the second electronic device.

21. The computer-readable storage device of claim 20, wherein the capturing the external sound comprises capturing a sound generated by the second electronic device.

22. The computer-readable storage device of claim 21, the operations further comprising:
quantizing the normalized object signal including generating the at least one quantization bit pattern; and
identifying at least one first quantization bit pattern of the at least one quantization bit pattern matching at least one second quantization bit pattern generated by the second electronic device,
wherein the generating of the encryption key comprises selecting one of the at least one first quantization bit pattern as the encryption key.

23. The computer-readable storage device of claim 20, wherein the capturing the external sound comprises capturing an ambient sound.

24. The computer-readable storage device of claim 23, the operations further comprising:
extracting a characteristic vector value corresponding to the object signal,
wherein the generating of the encryption key includes generating the encryption key based on the characteristic vector value.

25. The computer-readable storage device of claim 20, the operations further comprising:
re-using the encryption key by the first electronic device to encrypt subsequent communications with the second electronic device via an alternate communication channel.

26. A data encryption device comprising:
a capture unit configured to capture an external sound;
a normalization unit configured to perform normalization of the external sound to generate a normalized external sound based on at least one normalization parameter shared between the data encryption device and a data decryption device;
extracts a characteristic vector value corresponding to the object signal;
a key generation unit configured to generate an encryption key based on at least one quantization pattern associated with the normalized external sound including generates the encryption key based on similarities between the characteristic vector value and a plurality of sample characteristic vector values from a plurality of vector-key pairs each including a sample characteristic vector value and a key associated with the sample characteristic vector value;
and a transmitter configured to transmit data encrypted by the encryption key to the data decryption device.

27. The data encryption device of claim 26, wherein the external sound is an ambient sound.

28. The data encryption device of claim 26, wherein the external sound is a sound output from the data decryption device.

29. The data encryption device of claim 26, further comprising:
a quantization unit configured to perform quantization of the normalized external sound and to generate the at least one quantization pattern.

30. The data encryption device of claim 26, further comprising:
a matching unit configured to identify, among the at least one quantization pattern, a quantization pattern matching one of at least one second quantization pattern generated by the data decryption device,
wherein the key generation unit is further configured to select the quantization pattern as the encryption key.

31. The data encryption device of claim 30, wherein the quantization pattern is selected based on quantization bit depth.

32. The data encryption device of claim 26, wherein the external sound is an attenuating audio signal.

33. The data encryption device of claim 26, further comprising:
a characteristic extraction unit configured to extract a characteristic vector value corresponding to at least a part of the external sound.

34. The data encryption device of claim 33, wherein the key generation unit is further configured to generate the encryption key based on similarities between the characteristic vector value and a plurality of sample characteristic vector values included in a codebook, the codebook storing a plurality of vector-key pairs each including a sample characteristic vector value and a key associated with the sample characteristic vector value.

35. The data encryption device of claim 33, wherein the key generation unit is further configured to generate the encryption key based on a key generation function.

36. The data encryption device of claim 26, further comprising:
a storage configured to store the encryption key.

37. A device comprising:
a capture unit configured to capture an external image;
extracts a characteristic vector value corresponding to the object signal;
a key generation unit configured to generate an encryption key based on at least one quantization pattern associated with a normalized version of the external image including generating the encryption key based on similarities between the characteristic vector value and a plurality of sample characteristic vector values from a plurality of vector-key pairs each including a sample characteristic vector value and a key associated with the sample characteristic vector value, wherein the normalized version of the external image is generated based on at least one normalization parameter;
a transceiver configured to at least transmit the at least one normalization parameter and data encrypted by the encryption key to another device.

* * * * *

UNITED STATES PATENT AND TRADEMARK OFFICE
CERTIFICATE OF CORRECTION

PATENT NO. : 8,938,070 B2
APPLICATION NO. : 13/395119
DATED : January 20, 2015
INVENTOR(S) : Arakawa et al.

It is certified that error appears in the above-identified patent and that said Letters Patent is hereby corrected as shown below:

In the Drawings

Delete Drawing Sheet 9 of 9, and replace with new Drawing Sheet 9 of 9. (Attached)

In the Specification

In Column 1, Lines 6-9, delete "The subject application is a US national state application" and insert -- The present application is a U.S. national stage application filing under 35 U.S.C. § 371 --, therefor.

Signed and Sealed this
Thirtieth Day of June, 2015

Michelle K. Lee
*Director of the United States Patent and Trademark Office*